United States Patent [19]

Cottman et al.

[11] Patent Number: 5,310,811
[45] Date of Patent: May 10, 1994

[54] FREE RADICAL CURED RUBBER EMPLOYING ACRYLATE OR METHACRYLATE ESTERS OF HYDROXYBENZENE AND HYDROXYNAPHTHALENE COMPOUNDS AS CO-CURING AGENTS

[75] Inventors: Kirkwood S. Cottman, Akron; Kevin L. Rollick, Munroe Falls, both of Ohio

[73] Assignee: The Goodyear Tire & Rubber Company, Akron, Ohio

[21] Appl. No.: 124,787

[22] Filed: Sep. 22, 1993

[51] Int. Cl.$^5$ .............................................. C08F 8/00
[52] U.S. Cl. .................................. 525/305; 525/303; 525/304
[58] Field of Search .............................. 525/303, 305

[56] References Cited

U.S. PATENT DOCUMENTS

| | | | |
|---|---|---|---|
| 3,751,378 | 8/1973 | Cowperthwaite et al. | 260/4 |
| 3,867,270 | 2/1975 | Malatesta et al. | 204/159.18 |
| 3,954,907 | 5/1976 | Schober | 260/875 |
| 3,984,372 | 10/1976 | Cottman | 260/47 UA |
| 3,989,611 | 11/1976 | Shurpik | 204/159.18 |
| 4,168,387 | 9/1979 | Cottman | 560/144 |
| 4,562,281 | 12/1985 | Takahaski et al. | 560/104 |

FOREIGN PATENT DOCUMENTS 4224046 4/1967 Japan .
1358210 5/1972 United Kingdom .

OTHER PUBLICATIONS

*Rubber & Plastics News*, Feb. 20, 1989.
*Rubber & Plastics News*, Mar. 6, 1989.
*Rubber & Plastics News*, Sep. 2, 1991.
*Rubber World*, Oct. 1971.
Sartomer, "SARET TM " Cross-Linking Plasticizer for Injection Molding.
Sartomer, "Basic Principles of Peroxide-Coagent Curing of Elastomers".
SR, "Polyfunctional Methacrylate Monomers as Co-Agents in Peroxide Vulcanization of Nitrile Rubber".
SR, "Peroxide-Polyfunctional Monomer Vulcanization".
Sartomer, "Methacrylate Monomers as Used in the Peroxide Vulcanization of Nitrile Rubber".
Lucidol, "Chemical Curing of Elastomers and Cross-linking of Thermoplastics".
Lucidol, "Crosslinking with Peroxides:Improved Scorch Protection".
Lucidol, "Crosslinking EPDM with Luperco 500-SRL".
Sartomer, "Polyfunctional Methacrylate Monomers as Co-Agents in Peroxide Vulcanizations".

*Primary Examiner*—Bernard Lipman
*Attorney, Agent, or Firm*—Bruce J. Hendricks

[57] ABSTRACT

Free radically curable rubbers are crosslinked with the aid of a free radical initiator and a co-curing agent, which is an acrylate or methacrylate ester of a hydroxybenzene or hydroxynaphthalene compound containing two or more hydroxyl groups, at least two of which are esterified. The rubbers which are used in the present invention are natural rubber and synthetic rubbers derived from a diene monomer. Preferred co-curing agents are acrylate and methacrylate esters of hydroxybenzene compounds in which the ester contains two or three acrylate or methacrylate groups per molecule. The amount of co-curing agent may be about 1-50 parts by weight per one hundred parts by weight of rubber (phr). Outstanding abrasion resistance and air oven aging are observed.

20 Claims, No Drawings

FREE RADICAL CURED RUBBER EMPLOYING ACRYLATE OR METHACRYLATE ESTERS OF HYDROXYBENZENE AND HYDROXYNAPHTHALENE COMPOUNDS AS CO-CURING AGENTS

TECHNICAL FIELD

This invention relates to free radically cured rubber employing a co-curing agent (or coagent) and more particularly to improved curing systems employing improved co-curing agents.

BACKGROUND ART

Some of the most commonly used curing systems for curable polymers (including elastomers) are commonly classified as either sulfur curing systems or peroxide curing systems. Peroxide curing systems initiate crosslinking via free radical mechanisms, using as the curing agent a compound which is frequently described as an organic peroxide. Advantages of peroxide curing systems include: ability to cause crosslinking in lower compression set, better chemical and oil resistance, less discoloration, and better color stability with less staining. Problems associated with peroxide curing systems include scorch (premature crosslinking) and poor aging performance.

Coagents have been used in peroxide curing systems in order to ameliorate the disadvantages while capitalizing on the desirable characteristics of peroxide curing systems. By and large, these coagents are low molecular weight monomers and are usually either methacrylates, acrylates, cyanurates or isocyanurates.

Coagents usually increase crosslink density, which results in an increase in the cure state of a peroxide cured elastomer. It is therefore often possible to lower the amount of peroxide required to achieve a given state of cure. A coagent typically does not affect the rate of cure. On the negative side, a coagent may reduce scorch time.

Rubber & Plastics News. Feb. 20, 1989, pages 40-43, describes the use of organic peroxides for crosslinking elastomers. Various organic peroxides and peroxyketals are listed and discussed, as are representative polymers which can be crosslinked with the aid of an organic peroxide. This article also briefly discusses the effect of a coagent; among the coagents (or co-curing agents) mentioned is trimethylol propane trimethacrylate (TMPTMA).

Rubber & Plastic News, Sept. 2, 1991, pages 37-40, is directed primarily to scorch safety in coagent cured elastomers. As stated therein, coagents are used to improve processability and to enhance the physical properties of peroxide-cured elastomers. Coagents are described as low molecular weight monomers which behave as reactive plasticizers and lower the viscosity of the compound mixture. This article notes that they increase crosslink density, thereby often lowering the amount of peroxide required. On the other hand, they do result in shorter scorch time as the article notes. Representative coagents mentioned are 1,3-butylene glycol dimethacrylate (BGDMA), trimethylolpropane trimethacrylate (TMPTMA), zinc diacrylate (ZDA), and zinc dimethacrylate (ZDMA).

U.S. Pat. No. 3,751,378 to Cowperthwalte, et al, describes peroxide curing of elastomers in which a polyfunctional liquid aliphatic acrylate or methacrylate is employed as a coagent. One of the coagents is TMPTMA (SR.350). Mooney scorch time is improved by including in the curing recipe about 0.3-3 parts of either an N-nitroso diarylamine (N-nitroso diphenylamine is specifically illustrated) or N,N'-dinitroso diphenyl-p-phenylene diamine.

SUMMARY OF THE INVENTION

Broadly, this invention relates to free radical cure systems for rubber and processes which employ, as a coagent, an acrylate or methacrylate ester of a hydroxybenzene or a hydroxynaphthalene compound wherein the ester contains at least two acrylate or methacrylate groups per molecule, or a mixture of such compounds.

This invention according to another aspect relates to free radical curable polymer compositions comprising (a) a free radical curable polymer selected from the group consisting of natural rubber and synthetic rubbers derived from a diene monomer and mixtures thereof, (b) a free radical initiator, and (c) a co-curing agent or coagent which is an acrylate or methacrylate ester of a hydroxybenzene or hydroxynaphthalene compound wherein the ester contains at least two acrylate or methacrylate groups per molecule, or a mixture thereof. The free radical initiator may be either an organic free radical precursor or high energy radiation.

This invention according to a further aspect relates to cured products or vulcanizates of the above curable rubber. Rubbers cured with the use of a co-curing agent according to this invention have significantly greater NBS abrasion resistance than do peroxide cured polymers known in the art which contain the same rubber and use the same peroxide curing agent but a different coagent (or no coagent). Cured rubber of this invention also have superior aging properties. Scorch time is marginally to significantly better than those obtained in peroxide cure systems using coagents known in the art.

Throughout the specification, including the claims, all amounts are in parts by weight unless otherwise specified. Also "phr" denotes parts by weight per 100 of rubber.

DETAILED DESCRIPTION OF THE INVENTION

The co-curing agents (or coagents) used in the practice of this invention are acrylate and methacrylate esters of hydroxybenzene and hydroxynaphthalene compounds containing at least two hydroxyl groups per molecule, wherein at least two of the hydroxyl groups are converted to acrylate or methacrylate esters. When the parent hydroxybenzene or hydroxynaphthalene compound has two hydroxyl groups, both are esterified (i.e., no free hydroxyl groups are present). When three or more hydroxyl groups are present in the parent compound, it is not necessary that all be esterified (i.e., one or more free hydroxyl groups may be present). The parent hydroxybenzene and hydroxynaphthalene compounds may alternatively be called monocyclic and bicyclic phenolic compounds. The parent phenolic compounds preferably contain either two or three hydroxyl groups per molecule.

Preferred co-curing agents are diacrylate and dimethacrylate esters of hydroxybenzene compounds containing two hydroxyl groups per molecule, i.e., hydroquinone, resorcinol and catechol. Other coagents are diesters and triesters, i.e., the diacrylates, triacrylates, dimethacrylates and trimethacrylates of phloroglucinol (1,3,5-trihydroxybenzene), pyrogallol (1,2,3-trihydroxybenzene) and hydroxyquinol (1,2,4-trihydroxybenzene), all of which are trihydroxybenzenes containing three hydroxyl groups per molecule.

Other co-curing agents are the diesters of any of the isomeric dihydroxynaphthalenes (e.g., 1,2-, 1,3-, 1,4-, 1,5-, 1,6-, 1,7-, 1,8-, 2,3-, 2,6- or 2,7-dihydroxynaphthalene), and the diesters and triesters of any of the isomeric trihydroxynaphthalenes (e.g., 1,3,5.trihydroxynaphthalene). The ester group in each case is an acrylate or a methacrylate.

Specific esters which may be used in the present invention include 1,3.benzene diacrylate (also known as resorcinol diacrylate), I,3.benzene dimethacrylate (also known as resorcinol dimethacrylate), 1,4.benzene diacrylate (also known as hydroquinone diacrylate), 1,4-benzene dimethacrylate (also known as hydroquinone diacrylate), 1,2.benzene diacrylate, 1,2.benzene dimethacrylate, 1,2-naphthalene diacrylate, 1,2-naphthalene dimethacrylate, 1,3-naphthalene diacrylate, 1,3-naphthalene dimethacrylate, 1,4-naphthalene diacrylate, 1,4-naphthalene dimethacrylate, 1,5-naphthalene diacrylate, 1,5-naphthalene dimethacrylate, 1,6-naphthalene diacrylate, 1,6-naphthalene dimethacrylate, 1,7-naphthalene diacrylate, 1,7-naphthalene dimethacrylate, 1,8-naphthalene diacrylate, 1,8-naphthalene dimethacrylate, 2,3-naphthalene diacrylate, 2,3-naphthalene dimethacrylate, 2,6-naphthalene diacrylate, 2,6.naphthalene dimethacrylate, 2,7-naphthalene diacrylate, 2,7-naphthalene dimethacrylate, 1,3,5-benzene triacrylate, 1,3,5-benzene trimethacrylate, 1,2,3-benzene triacrylate, 1,2,3-benzene trimethacrylate, 1,2,4-benzene triacrylate, 1,2,4-benzene trimethacrylate, 1-hydroxybenzene-3,5-diacrylate, 1-hydroxybenzene 3,5-dimethacrylate, 1hydroxybenzene-2,3-diacrylate, 1-hydroxybenzene-2,3-dimethacrylate, 1-hydroxybenzene2,4-diacrylate, 1-hydroxybenzene 2,4-dimethacrylate, 1,3,5naphthalene triacrylate and its isomers, 1,3,5-naphthalene trimethacrylate and its isomers, 1-hydroxy naphthalene-3,5-diacrylate and its isomers, 1-hydroxy naphthalene-3,5-dimethacrylate and its isomers.

The most preferred co-curing agent is 1,4-benzene diacrylate and 1,4-benzene dimethacrylate.

The acrylates and methacrylates of this invention may be prepared by any of the methods known to the art. Examples of some general methods of preparing acrylate or methacrylate esters are described in U.S. Pat. Nos. 3,984,372, 4,168,387 and 4,562,281. While these patents do not specify the acrylate or methacrylate esters used in the present invention, the general methods used in these patents may be used to prepare the acrylates and methacrylates used herein.

Either a single co-curing agent or a mixture thereof, as above described, can be used.

The co-curing agents or coagents are so called because they are incapable of initiating crosslinking by themselves. Rather, they are used in conjunction with a free radical initiator to modify the course of curing and to obtain enhanced properties.

The amount of co-curing agent or mixture thereof varies broadly from about one to about 50 phr (parts by weight per one hundred parts by weight of rubber), preferably from about 2 to about 20 phr, more preferably from about 5 to about 20 phr.

The curing agent (primary curing agent) of the present invention is a free radical initiator. Free radical initiators may be broadly classified into two classes, i. e., organic free radical precursors, (most commonly organic peroxide compounds, although not necessarily) and high energy radiation such as ultra-violet light, gamma rays, electron beam and other means known in the art.

The high energy radiation may be accomplished by subjecting the rubber containing the acrylate or methacrylate esters of hydroxybenzene and hydroxynaphthalene to an adequate dose of high energy particle radiation. The treatment can be carried out by passing the composition, suitably in the form of a thin layer of from about I.3 mm to 6.4 mm (0.05 to 0.25 inches) in thickness through a beam of high energy electrons under conditions that will give a high energy dose of from 0.5 to 15 megarads. Such a dose is usually sufficient to effect any desired degree of vulcanization of the rubber from a relatively flexible to a hard product. In general, doses of from 2 to 10 megarads are preferred. Typically the dose rate is from about 0.02 to 5 megarads/sec. although appreciable variation is possible. With thicker sheets, for example, up to 1.27 mm (0.5 inches), the desired results can be achieved by two passes through the electron beam, first on one side and then on the other.

Various dose rates can be achieved from conventional radiation equipment by techniques known in the art. For example, the desired amount of irradiation can be obtained using a 300 KeV electron accelerator which emits a circular beam of electrons from a heated cathode filament. The electrons are guided through a scanning magnet and emerge through a thin titanium window which is approximately 2.54 mm to 61 mm (1 to 24 inches). A beam power of 3 kw is obtained at an operating current of 10 mamps. The dose delivered can be measured using the well known blue cellophane technique. See Henley and Richman: Anal. Chem. 28, 1580 (1956). By altering the beam current, beam diameter and distance to the source, various dose rates of radiation can be obtained.

Suitable organic free radical precursors include peroxides, which may be diacyl or dialkyl peroxides, hydroperoxides, peroxyesters or peroxyketals and include the following compounds:

Dialkyl peroxides

α,α'-Bis (t-butylperoxy)-isopropylbenzene
2,5-Dimethyl-2,5-di(t-butylperoxy)hexane
t-Butyl cumyl peroxide
Di-t-butyl peroxide
2,5-Dimethyl-2,5-di-(t-butylperoxy)hexyne-3

Peroxyketals 1,1-Bis(t-butylperoxy)-3,3,5-trimethylcyclohexane
1,1-Di(t-butylperoxy)-cyclohexane
n-Butyl 4,4-bis(t-butylperoxy)-valerate
Ethyl 3,3-di(t-butylperoxy)- butyrate Diacyl peroxides Lauroyl peroxide Hydroperoxides t-Butyl hydroperoxide
t-Amyl hydroperoxide
Cumene hydroperoxide Peroxyesters t-Butyl peroxy pivalate
t-Butyl peroxy-2-ethylhexanoate
t-Butyl peroxy benzoate The amount of organic free radical precursor will vary depending on the particular rubber, the organic free radical precursor and the desired rate of cure. Generally speaking, the amount may range from about 1 to 50 phr. Preferably, the amount will range from about 2 to 20 phr with a range of from 5 to 20 phr being particularly preferred.

Rubbers which can be cured or crosslinked in accordance with the present invention must have some unsaturated sites. Therefore, saturated polymers are not intended for use in the present invention. Suitable unsaturated polymers include natural rubber and synthetic rubbers derived from a diene monomer. In general, any diene polymer, i.e., a homopolymer or a copolymer of a conjugated diene such as 1,3-butadiene or isoprene, can be crosslinked in accordance with this invention. The diene polymers are unsaturated, as those skilled in the art will recognize.

Representative rubbers which can be crosslinked or cured in accordance with this invention include the following:
- ethylene-propylene-diene terpolymer (EPDM)
- natural polyisoprene rubber (NR)
- synthetic polyisoprene (IR)
- styrene isoprene rubber (SIR)
- styrene butadiene rubber (SBR)
- styrene isoprene butadiene rubber (SIBR)
- polybutadiene rubber (BR)
- nitrile rubber (acrylonitrile-butadiene copolymer) (NBR)
- partially hydrogenated nitrile rubber, at least 4% unsaturation (HNBR)
- polychloroprene (CR)

The preferred rubbers for use in the present invention are natural polyisoprene, synthetic polyisoprene, styrene-isoprene rubber, styrene-butadiene rubber, styrene-isoprene-butadiene rubber, polybutadiene rubber, nitrile rubber and partially hydrogenated rubber (such as IR, SIR, SBR, SIBR, BR, and HNBR).

In addition to the above, other additives may be incorporated into the free radically curable rubber. These additives may be those which are conventionally used in free radically curable polymers, and may include, for example, carbon black, silica, zinc oxide, stearic acid, tackifier resins, processing aids, antioxidants, antiozonants, activators, blowing agents, plasticizers, waxes and oils. Such additives may be used in conventional amounts.

Processing conditions and procedures may be those which are conventional for free radically cured rubbers. Compounding may include preparation of a masterbatch, if desired. Conventional compounding equipment such as a Banbury mixer may be used. When an organic free radical precursor is used, curing may be carried out at conventional temperatures, e.g., about 100° to about 200° C (212° F to 392° F) for conventional curing times.

Abrasion resistance and high temperature aging characteristics (in both air and hot water) are outstanding in cured or crosslinked polymers in accordance with this invention.

Compositions of this invention were also found to have better scorch characteristics and higher crosslinking densities than comparative compositions in which commercially available co-curing agents were used. In rheometer tests comparing experimental samples according to this invention with comparative samples containing either trimethylol propane trimethacrylate (TMPTMA) or zinc dimethacrylate (ZDMA) (compositions and processing conditions being the same except for the co-curing agent), experimental samples according to this invention were found to have slightly better scorch characteristics than those compounded with TMPTMA and significantly better scorch characteristics than comparative samples compounded with ZDMA, as shown by lower minimum torque in all experimental samples than in any of the comparative samples. The minimum torque data may also indicate better plasticization in compounds of this invention. Samples according to this invention showed higher maximum torque and delta torque values than those prepared with TMPTMA, indicating higher crosslinking density. Maximum torque values obtained with samples containing ZDMA are always higher than those in the experimental samples of this invention but delta torque was variable, possibly because of the scorching nature of compounds containing ZDMA. This suggests that compounds of this invention combine good scorch resistance with high crosslinking density, a combination not exhibited in compounds containing either of the two commercial co-curing agents tested.

Cured compounds of this invention have low compression set, which is generally characteristic of peroxide cured elastomers. Compression set in test samples of this invention was found to be about equal to those in the control (no co-agent).

EXAMPLE

This example describes preparation and testing of cured elastomer samples of different compositions, designated A through H. These samples are as follows:
- A—Control—sulfur cured (no coagent)
- B—Control—peroxide cured (no coagent)
- C & D—Comparative—peroxide cured; coagent is SR 350, which is trimethylol propane trimethacrylate (TMPTMA)
- E & F—Comparative peroxide—cured; coagent is SR-365, which is zinc dimethacrylate (ZDMA), available from Sartomer Co., West Chester, Pa.
- G & H—Experimental—peroxide cured, coagent is hydroquinone dimethacrylate (HQDMA)

Coagent loading is 5 phr in compositions C, E and G, and 10 phr in compositions D, F, and H.

Table I below is a comparison of the coagents, showing the molecular weight, the equivalent weight, and the number of milliequivalents (mEq) per 10 grams of SR-350, SR-365 and hydroquinone dimethacrylate (HQDMA).

TABLE I

| Co-agent | Comparison of Co-Agents | | |
|---|---|---|---|
|  | MW | Eq. wt. | mEq./10 g |
| SR-350 (1) | 338.4 | 112.8 | 88.7 |
| SR-365 (2) | 235.6 | 117.8 | 84.9 |
| HQDMA (3) | 246.3 | 123.1 | 81.2 |

(1) Trimethylol propane trimethacrylate (TMPTMA). Comparative co-agent available from Sartomer Co., West Chester, Pa.

(2) Zinc dimethacrylate (ZDMA). Comparative coagent. Available from Sartomer Co., West Chester, Pa.

(3) Hydroquinone dimethacrylate. Test co-agent. Hydroquinone dimethacrylate (HQDMA) and other acrylic and methacrylic esters of phenols can be prepared according to Example A through E below.

EXAMPLE A

Preparation of 1,4-benzene dimethacrylate

Into a one liter three neck flask which was equipped with a stirrer, water condenser, thermometer and addition funnel was added 55g hydroquinone (1,4-benzenediol), 94.5g methacrylic acid (MAA), 100 ml tetrahydrofuran and 350ml toluene. Then 244 g of triethylamine was added with cooling. Then 121 g phosphorus oxychloride ($POCl_3$) was added over a 20 minute period between 22° and 55° C. The flask contents were further reacted at 72° C. for two hours and then filtered. The filtrate was distilled to remove the volatiles, thus leaving 75 g of an amber crystalline semi solid. It was dissolved in 250 ml of methanol and crystallized in dry ice to give a white powder with a melting point of 87° to 89° C. Gel Permeation Chromatography (GPC) and NMR confirmed that the product was the 1,4-benzene dimethacrylate.

Example B

Preparation of 1,4-benzene dimethacrylate

Using the equipment described above, 110 g hydroquinone (1,4 benzenediol) were dissolved in 323 g triethylamine and 700 g toluene. While maintaining a temperature between 18° and 46° C., 239g of methacryloyl chloride was added over a 30 minute period. The reactor contents were reacted an additional 30 minutes and then washed twice with 250 ml of water. The product was washed finally with 250ml of water which contained 3 g of sodium dithionite, $Na_2S_2O_4$, and then filtered. The volatiles were stripped from the product after adding approximately 0.1 g of 4-hydroxy-2,2,6,6-tetramethylpiperidine, N-oxide (CAS Registry No. 2226.96.2), a free radical polymerization inhibitor also known as 4-hydroxytempo. The stripped product was dissolved in 650ml methanol and crystallized at −8° C. The white powder when dried weighed 155 g. GC indicated the product was 91.3 percent pure 1,4-benzene dimethacrylate.

EXAMPLE C

Preparation of 1,3-benzene diacrylate

Using the equipment described above, 27.5g resorcinol (1,3-benzenediol) and 220g toluene were stirred together. To the mixture was added 55q triethylamine and 0.1 g 4-hydroxy-2,2,5,6-tetramethylpiperidine, N-oxide. The flask contents were cooled to 15° C. and then 52.5g of acryloyl chloride was added over a 20 minute period between 20 and 24° C. The reactor contents were stirred 20 minutes longer and then checked by gas chromatography (GC). GC showed 5.5% of 1-hydroxybenzene 3-acrylate and 94.0% of the 1,3-benzene diacrylate. The reaction product was washed two times with warm water, decanted and filtered. The toluene and other volatiles were removed by distillation. GC analysis indicated the final product contained 4.8% of the 1-hydroxybenzene-3-acrylate and 95.2% of 1,3-benzene diacrylate. NMR was used to confirm the structure of the 1,3-benzene diacrylate structure.

EXAMPLE D

Preparation of 1,5-naphthalene diacrylate

Using the equipment described above, 25.0 g of 1,5-dihydroxynaphthalene, 150 g toluene, and 39.4 g of triethylamine were stirred in a reactor. To the reactor was added dropwise 28.4 g of acryloyl chloride below 38° C. over a 15 minute period. To the reactor was added 50 mls of tetrahydrofuran to try to better solubilize the product. After stirring the reactor contents for an additional 30 minutes, 150 ml water was added. The water containing the salts would not separate. Hence, the reactor contents were filtered. The filter cake was washed with hot water. GC analysis indicated that the isolated product contained 95.4% of the desired 1,5-naphthalene diacrylate, 3.3% of 1-hydroxy naphthalene-5-acrylate and 1.4% of unreacted 1,5-dihydroxynaphthalene. The product had a melting point of 148° to 152° C.

EXAMPLE E

Preparation of 1,3,5-benzene trimethacrylate

In a manner similar to Example B, 1,3,5-trihydroxybenzene was reacted with methacryloyl chloride to prepare 1,3,5-benzene trimethacrylate. GC analysis indicated the product contains 95% of the desired product.

Compounding

All samples, including control samples A and B, comparative samples C through F, and experimental (or test) samples G and H, were compounded according to the recipes shown in Table II. All amounts in Table II are in parts by weight per 100 parts of rubber (phr).

TABLE II

| Ingredient | Recipe (phr) | | | | | | | |
|---|---|---|---|---|---|---|---|---|
|  | A | B | C | D | E | F | G | H |
| NBR (1) | 100.0 | 100.0 | 100.0 | 100.0 | 100.0 | 100.0 | 100.0 | 100.0 |
| Sulfur (2) | 0.50 | 0.00 | 0.00 | 0.00 | 0.00 | 0.00 | 0.00 | 0.00 |
| Zinc Oxide | 5.00 | 5.00 | 5.00 | 5.00 | 5.00 | 5.00 | 5.00 | 5.00 |
| Stearic Acid | 1.00 | 1.00 | 1.00 | 1.00 | 1.00 | 1.00 | 1.00 | 1.00 |
| Carbon Black FEF | 40.00 | 40.00 | 40.00 | 40.00 | 40.00 | 40.00 | 40.00 | 40.00 |
| SR-350 (3) | 0.00 | 0.00 | 5.00 | 10.00 | 0.00 | 0.00 | 0.00 | 0.00 |
| SR-365 (4) | 0.00 | 0.00 | 0.00 | 0.00 | 5.00 | 10.00 | 0.00 | 0.00 |
| HDQMA (5) | 0.00 | 0.00 | 0.00 | 0.00 | 0.00 | 0.00 | 5.00 | 10.00 |
| Methyl Tuads (6) | 3.00 | 0.00 | 0.00 | 0.00 | 0.00 | 0.00 | 0.00 | 0.00 |
| Di-Cup 40C (7) | 0.00 | 4.00 | 4.00 | 4.00 | 4.00 | 4.00 | 4.00 | 4.00 |

(1) "Chemigum" N615, available from The Goodyear Tire and Rubber Company, Akron, Ohio.

(2) 80% sulfur, available from Polymerics, Cuyahoga Falls, Ohio.

(3) Trimethylol propane trimethacrylate (TMPTMA). Comparative co-agent. Available from Sartomer Co., West Chester, Pa.

(4) Zinc dimethacrylate (ZDMA). Comparative co-agent. Available from Sartomer Co., West Chester, Pa.

(5) Hydroquinone dimethacrylate. Test co-agent.

(6) Tetramethyl thiuram disulfide; accelerator; available from R.T. Vanderbilt Co., Inc., Norwalk, Ct.

(7) Dicumyl peroxide (40% active ingredient, 60% inerts); available from Hercules, Inc., Wilmington, De.

Curing and Rheometer Testing

Samples having compositions A through H as shown in Table II were cured at 160° C. (320° F.) and 171° C. (340° F.). Rheometer data were obtained using a Monsanto model #R100s rheometer, with 1° of arc, a speed of 100 cycles per minute [CPM], for a time of 60 minutes. Rheometer test results and other cure data are shown in Table III below. All torque values are in decinewton meters (dN.m) Abbreviations used in Table III are as follows:

Abbreviations t'c50: Time to 50 percent cure, (minutes)
t'c90 : Time to 90 percent cure, (minutes)
Cure Rate:$(S_{90}-S_{25})/t'c90-t'c25)$, dN·m/min., where $S_{90}$ equals torque at 90 percent cure, $S_{25}$ equals torque at percent cure and t,25 equals time to 25 percent cure (minutes)
MS: Mooney, small rotor
T5: Time to 5 Mooney unit rise above minimum (minutes)

TABLE III

|  | A | B | C | D | E | F | G | H |
|---|---|---|---|---|---|---|---|---|
| Cure Data Rheometer, 160° C., 1° Arc, 100 CPM | | | | | | | | |
| Torque, min. | 5.8 | 10.0 | 11.8 | 13.5 | 14.1 | 19.8 | 9.8 | 10.6 |
| Torque, max. | 43.4 | 46.5 | 53.2 | 64.5 | 72.0 | 82.2 | 60.1 | 71.7 |
| TS 1, minutes | 2.5 | 2.1 | 2.1 | 2.1 | 2.1 | 2.1 | 2.1 | 2.1 |
| t'C50, minutes | 4.8 | 5.7 | 5.5 | 5.6 | 5.5 | 5.5 | 5.6 | 5.7 |
| t'C90, minutes | 9.4 | 16.0 | 16.3 | 20.6 | 19.2 | 18.6 | 16.3 | 17.4 |
| Cure Rate | 4.18 | 1.89 | 2.05 | 1.91 | 2.38 | 2.67 | 2.55 | 2.84 |
| Cure Data Rheometer, 171° C., 1° Arc, 100 CPM | | | | | | | | |
| Torque, min. | 7.7 | 14.9 | 18.8 | 23.6 | 24.1 | 31.1 | 15.8 | 18.7 |
| Torque, max. | 40.1 | 45.5 | 55.8 | 71.7 | 71.4 | 79.4 | 60.5 | 73.4 |
| TS 1 | 2.1 | 2.1 | 2.1 | 2.1 | 2.1 | 2.1 | 2.2 | 2.1 |
| t'C50 | 2.9 | 3.3 | 3.2 | 3.6 | 3.2 | 3.1 | 3.2 | 3.3 |
| t'C90 | 4.5 | 7.3 | 8.4 | 11.5 | 8.3 | 8.0 | 7.9 | 8.3 |
| Cure Rate | 9.68 | 4.18 | 3.99 | 3.48 | 5.27 | 5.59 | 5.33 | 6.14 |
| Min. @ 171° | 15 | 15 | 15 | 15 | 15 | 15 | 15 | 15 |
| Scorch, MS/121° C. minimum (dN.m) | 22 | 25 | 21 | 18 | 27 | 42 | 21 | 17 |
| T5 | 16.0 | 21.2 | 6.7 | 5.5 | 5.4 | 4.1 | 7.1 | 6.0 |

Cure data presented in Table III suggest several advantages of the experimental coagent, HQDMA, over SR-350 and SR-365. The minimum torque for the experimental coagent was lower in all cases than for the commercial materials. This reflects in part better scorch (only slightly better than SR-350) and possibly better plasticization. The maximum torque and delta torque values were also higher for the experimental coagent versus SR-350 in spite of the 10 percent higher methacrylate level in SR-350. The maximum torque obtained with SR.365 was always higher than with the experimental but delta torque was variable.

Scorch times of the experimental samples G and H were marginally better than those containing SR-350 (samples C and D) and much better than those containing SR-365 (samples E and F).

Physical Properties

Physical properties of samples having compositions A through H were measured. Physical properties measured were: specific gravity, tensile strength (in pounds per square inch, psi), percentage elongation, Shore A hardness, tear strength in pounds per inch (ppi), NBS (National Bureau of Standards) abrasion resistance. These properties were measured in cured samples as formed, i.e., before aging.

All tensile tests, i.e., tensile strength and percentage elongation, were obtained according to ASTM D 412 using a United Model FM.30 DMIVA tensile tester, Die C.

Hardness tests were carried out according to the procedure of ASTM D 2240, using a Shore Durometer Type A2, Model 4150.

Abrasion tests were carried out according to ASTM D 1630 using a NBS Abrader.

Rheometer test data were obtained with a Monsanto Rheometer, Model No. R100S (ASTM Test D 2084).

Scorch tests were obtained according to ASTM D 1646, using a Mooney Viscometer, Model 1300.

Results are shown in Table IV below. The phrase, "Original Physical Properties", in the heading of Table IV denotes properties before aging.

TABLE IV

| | Original Physical Properties | | | | | | | |
|---|---|---|---|---|---|---|---|---|
| | A | B | C | D | E | F | G | H |
| Specific Gravity | 1.165 | 1.176 | 1.178 | 1.181 | 1.184 | 1.203 | 1.184 | 1.188 |
| Tensile, United Die C | | | | | | | | |
| Tensile, psi | 3300 | 3109 | 3004 | 3244 | 3296 | 3322 | 3008 | 3316 |
| Elongation, % | 365 | 215 | 150 | 126 | 185 | 150 | 110 | 77 |
| Hardness, Shore A | 69 | 73 | 78 | 81 | 88 | 83 | 81 | 87 |
| Tear, Die (C) ppi | 250 | 196 | 176 | 186 | 218 | 210 | 189 | 181 |
| NBS Abrasion | 451 | 698 | 1149 | 1336 | 544 | 586 | 1648 | 1737 |

Tensile strength did not vary greatly from one sample to another.

Elongation and Shore A hardness did show significant variations from compound to compound. The experimental samples showed the greatest decrease in elongation. Elongations in experimental samples G and H were about 60-70% of those in sample C and D employing SR-350 at similar loadings. Still higher elongations were observed in samples E and F, which employed SR-365 as the coagent. In both experimental and comparative samples, a greater amount of coagent results in a decrease in elongation. This value showed fairly slight, but yet significant variations from compound to compound in samples employing a coagent. (Control samples A and B, containing no coagent, had significantly lower hardness values). Hardness value in sample E (5 phr ZDMA) is out of line with expected values and with other data obtained. This value may have been measured or reported erroneously. The low elongation values in experimental samples G and H as compared to elongation in comparative samples C–F suggest a higher degree of crosslinking in the experimental samples.

NBS abrasion values in experimental samples G and H were outstanding, far higher than those obtained in either control or comparative samples.

Compression set was determined by treating several samples of each composition for 48 hrs. at 212° F. (100° C.) and at 70 hrs. at 250° F. (121° C.). Compression set is recorded as a percentage, as shown in ASTM D 395, Method B. Results are shown in Table V below.

TABLE V

| | Compression Set After Aging | | | | | | | |
|---|---|---|---|---|---|---|---|---|
| | A | B | C | D | E | F | G | H |
| Compression Set 48 hrs. @ 100° C. Average | 7.09 | 6.02 | 6.35 | 10.24 | 12.78 | 13.53 | 4.62 | 6.11 |
| Compression Set 70 hrs. @ 121° C. Average | 8.63 | 6.52 | 6.20 | 10.43 | 12.70 | 13.36 | 4.69 | 6.06 |

Aging Tests

Physical properties of samples A through H were determined after aging. Aging tests were conducted as follows:

(1) Circulating air oven, 70 hrs. at 250° F. (121° C.).
(2) Fluid aging in ASTM #3 Oil, 70 hrs. at 212° F. (100° C.).
(3) Fluid aging in ASTM Fuel B, 70 hrs. at room temperature.
(4) Fluid aging in water, 70 hrs., at 212° F. (100° C).

The words, "% retained" and "Point Change" denote comparisons of physical properties in aged samples vs. the same properties in unaged samples of the same composition.

Properties of aged samples are reported in Table VI.

TABLE VI

| | A | B | C | D | E | F | G | H |
|---|---|---|---|---|---|---|---|---|
| Aged Physical Properties Cir. Air Oven Aging - 70 hrs. @ 121° C.; United Die C | | | | | | | | |
| Tensile, psi | 3203 | 680 | 1044 | 1244 | 1215 | 1441 | 1699 | 2618 |
| % retained | 97 | 22 | 35 | 38 | 37 | 43 | 56 | 79 |
| Elongation, % | 286 | 41 | 47 | 42 | 59 | 48 | 56 | 50 |
| % retained | 78 | 19 | 31 | 33 | 32 | 32 | 51 | 65 |
| Hardness, Shore A | 72 | 79 | 82 | 85 | 82 | 86 | 84 | 89 |
| Point Change | 3 | 6 | 4 | 4 | −6 | 3 | 3 | 2 |
| Fluid Aging 70 hrs. @ 100° C., ASTM #3 Oil/United Die C | | | | | | | | |
| Tensile, psi | 2967 | 2907 | 2878 | 2338 | 3023 | 3267 | 2770 | 2425 |
| % retained | 90 | 94 | 96 | 72 | 92 | 98 | 92 | 73 |
| Elongation, % | 331 | 195 | 131 | 92 | 163 | 132 | 97 | 59 |
| % retained | 91 | 91 | 87 | 73 | 88 | 88 | 88 | 77 |
| Hardness, Shore A | 63 | 67 | 72 | 77 | 69 | 80 | 76 | 84 |
| Point Change | −6 | −6 | −6 | −4 | −19 | −3 | −5 | −3 |
| Vol. Swell, % | 16.7 | 17.5 | 14.6 | 13.8 | 13.9 | 12.8 | 13.0 | 13.9 |
| Aged Physical Properties Fluid Aging 70 hrs. @ RT, ASTM Fuel B/United Die C | | | | | | | | |
| Tensile, psi | 1285 | 1135 | 908 | 1648 | 1254 | 1541 | 1451 | 1389 |
| % retained | 39 | 37 | 30 | 51 | 38 | 46 | 48 | 42 |
| Elongation, % | 174 | 109 | 68 | 76 | 91 | 81 | 65 | 40 |
| % retained | 48 | 51 | 45 | 60 | 49 | 54 | 59 | 52 |
| Hardness, Shore A | 57 | 63 | 68 | 74 | 69 | 74 | 73 | 80 |
| Point Change | −12 | −10 | −10 | −07 | −19 | −09 | −08 | −07 |
| Vol. Swell, % | 34.9 | 35.8 | 32.6 | 30.6 | 31.5 | 30.4 | 32.4 | 28.9 |
| Aged Physical Properties Fluid Aging 70 hrs. @ 100° C., Water/United Die C | | | | | | | | |
| Tensile, psi | 3026 | 3123 | 3378 | 3423 | 3308 | 3033 | 3146 | 3046 |
| % retained | 92 | 100 | 112 | 106 | 100 | 91 | 105 | 92 |
| Elongation, % | 335 | 221 | 518 | 869 | 191 | 146 | 761 | 81 |
| % retained | 92 | 103 | 345 | 690 | 103 | 97 | 692 | 105 |
| Hardness, Shore A | 65 | 71 | 75 | 80 | 77 | 81 | 78 | 85 |
| Point Change | −4 | −2 | −3 | −1 | −11 | −2 | −3 | −2 |
| Vol. Swell, % | 2.7 | 2.5 | 2.0 | 0.3 | 0.3 | 2.4 | 3.3 | 4.2 |

The experimental coagent HQDMA (runs G and H) shows considerable improvement over the values obtained with commercial coagents (columns C–F). Compression set increases with increase in level of co-curing agent in both experimental and control runs. At the 5 phr level, experimental samples (run G) showed about 25% lower compression set on a relative basis, or 2.5 percentage points lower on an absolute basis, than those containing a 5 phr. of SR.350 (run C). Samples compounded with the other comparative agent, SR.365, showed much higher compression set (run E).

Experimental samples (runs G and H) showed significantly better air aging than did samples employing any of the comparative coagents (runs C–F). Experimental samples containing 5 phr of coagent (run G) retained 56% of original tensile strength and 51% of original elongation; those containing 10 phr of experimental coagent (run H) retains 79% of original tensile strength and 65% of original elongation. This represents an outstanding improvement over results obtained with comparative coagents (runs C–F) and a remarkable increase over values obtained in the peroxide-cured control (run B). Air oven aging performance is typically poor for peroxide cured stocks. In this study, performance is even worse since the only antioxidant present is the raw polymer stabilizer.

Fluid aging tests in liquid media did not show any major differences between experimental and comparative samples.

While certain representative embodiments and details have been shown for the purpose of illustrating the invention, it will be apparent to those skilled in the art that various changes and modifications may be made therein without departing from the spirit or scope of the invention.

What is claimed is:

1. A process for free radical curing of a polymer or mixture thereof which comprises using a free radical initiator and as a co-curing agent an acrylate or methacrylate ester of a hydroxybenzene or hydroxynaphthalene compound, wherein said ester contains at least two acrylate or methacrylate groups per molecule, or a mixture thereof wherein said polymer is selected from the group consisting of ethylene-propylene-diene terpolymer, natural polyisoprene rubber, synthetic polyisoprene, styrene isoprene rubber, styrene butadiene rubber, styrene isoprene butadiene rubber, polybutadiene rubber, nitrile rubber, partially hydrogenated nitrile rubber, polychloroprene and mixtures thereof.

2. A process according to claim 1 wherein said co-curing agent contains two acrylate or methacrylate groups per molecule.

3. A process according to claim 1 wherein said co-curing agent contains three acrylate or methacrylate groups per molecule.

4. The process of claim 1 wherein said co-curing agent is selected from the group consisting of 1,3-benzene diacrylate, 1,3-benzene dimethacrylate, 1,4-benzene diacrylate, 1,4-benzene dimethacrylate, 1,2-benzene diacrylate, 1,2-benzene dimethacrylate, 1,2-naphthalene diacrylate, 1,2-naphthalene dimethacrylate, 1,3-naphthalene diacrylate, 1,3-naphthalene dimethacrylate, 1,4-naphthalene diacrylate, 1,4-naphthalene dimethacrylate, 1,5-naphthalene diacrylate, 1,5-naphthalene dimethacrylate, 1,6-naphthalene diacrylate, 1,6-naphthalene dimethacrylate, 1,7-naphthalene diacrylate, 1,7-naphthalene dimethacrylate, 1,8-naphthalene diacrylate, 1,8-naphthalene dimethacrylate, 2,3.naphthalene diacrylate, 2,3-naphthalene dimethacrylate, 2,6-naphthalene diacrylate, 2,6-naphthalene dimethacrylate, 2,7-naphthalene diacrylate, 2,7-naphthalene dimethacrylate, 1,3,5-benzene triacrylate, 1,3,5benzene trimethacrylate, 1,2,3-benzene triacrylate, 1,2,3-benzene trimethacrylate, 1,2,4-benzene triacrylate, 1,2,4-benzene trimethacrylate, 1-hydroxybenzene-3,5-diacrylate, 1-hydroxybenzene-3,5-dimethacrylate, 1-hydroxybenzene2,3-diacrylate, 1-hydroxybenzene-2,3-dimethacrylate, 1-hydroxybenzene-2,4-diacrylate, 1-hydroxybenzene-2,4-dimethacrylate, 1,3,5-naphthalene triacrylate and its isomers, 1,3,5naphthalene trimethacrylate and its isomers, 1-hydroxy naphthalene-3,5-diacrylate and its isomers, 1-hydroxy naphthalene.3,5.dimethylacrylate and its isomers.

5. The process of claim 4 wherein said co-curing agent is selected from the group consisting of 1,3-benzene diacrylate, 1,3-benzene dimethacrylate, 1,4-benzene dimethacrylate, and 1,4-benzene diacrylate.

6. A process according to claim 1 wherein the amount of said co-curing agent is from about 1 to about 50 phr.

7. A process according to claim 6 wherein the amount of said co-curing agent is from about 2 to about 20 phr.

8. A process according to claim 7 wherein the amount of said co-curing agent is from about 5 to about 20 phr.

9. A process according to claim 1 wherein the free radical initiator is an organic free radical precursor.

10. A process according to claim 1 wherein the free radical initiator is a high energy radiation.

11. A free radical curable polymer composition comprising:
  (a) a free radical curable polymer selected from the group consisting of natural rubber and synthetic rubbers derived from a diene monomer and mixtures thereof; and
  (b) a free radical initiator, and
  (c) a co-curing agent, wherein said co-curing agent is an acrylate or methacrylate ester of a hydroxybenzene or hydroxynaphthalene compound, wherein said ester contains at least two acrylate or methacrylate groups per molecule, or a mixture thereof.

12. A free radical curable polymer composition according to claim 11 wherein said ester contains two acrylate or methacrylate groups per molecule.

13. A free radical curable polymer composition according to claim 11 wherein said co-curing agent contains three acrylate or methacrylate groups per molecule.

14. A free radical curable composition according to claim 11 wherein said co-curing agent is selected from the group consisting of 1,3-benzene diacrylate, 1,3-benzene dimethacrylate, 1,4-benzene diacrylate, 1,4.benzene dimethacrylate, 1,2-benzene diacrylate, 1,2-benzene dimethacrylate, 1,2-naphthalene diacrylate, 1,2-naphthalene dimethacrylate, 1,3-naphthalene diacrylate, 1,3-naphthalene dimethacrylate, 1,4-naphthalene diacrylate, 1,4-naphthalene dimethacrylate, 1,5-naphthalene diacrylate, 1,5-naphthalene dimethacrylate, 1,6-naphthalene diacrylate, 1,6-naphthalene dimethacrylate, 1,7-naphthalene diacrylate, 1,7-naphthalene dimethacrylate, 1,8-naphthalene diacrylate, 1,8-naphthalene dimethacrylate, 2,3-naphthalene diacrylate, 2,3-naphthalene dimethacrylate, 2,6-naphthalene diacrylate, 2,6-naphthalene dimethacrylate, 2,7-naphthalene benzene triacrylate, 1,3,5-benzene trimethacrylate, 1,2,3-benzene triacrylate, 1,2,3 benzene trimethacrylate, 1,2,4-benzene triacrylate, 1,2,4-benzene trimethacrylate, 1-hydroxybenzene-3,5-diacrylate, 1-hydroxybenzene-3,5-dimethacrylate, 1-hydroxybenzene.2,3-diacrylate, 1-hydroxybenzene-2,3-dimethacrylate, 1-hydroxybenzene.2,4-diacrylate, 1-hydroxybenzene-2,4-dimethacrylate, 1,3,5-naphthalene triacrylate and its isomers, 1,3,5.naphthalene trimethacrylate and its isomers, 1-hydroxy naphthalene-3,5-diacrylate and its isomers, 1-hydroxy naphthalene-3,5-dimethylacrylate and its isomers.

15. A free radical curable composition according to claim 14 wherein said co-curing agent is selected from the group consisting of 1,3-benzene diacrylate, 1,3benzene dimethacrylate, 1,4-benzene diacrylate and 1,4-benzene dimethacrylate.

16. A free radical curable composition according to claim 11 wherein the amount of said co-curing agent is from about 1 to about 50 phr.

17. A free radical curable composition according to claim 16 wherein the amount of said co-curing agent is from 2 to about 20 phr.

18. A free radical curable composition according to claim 11 wherein the free radical initiator is an organic free radical precursor.

19. A free radical curable composition according to claim 12 wherein the free radical initiator is a high energy radiation.

20. A free radical curable composition according to claim 11 wherein said polymer is selected from the group consisting of natural polyisoprene rubber, synthetic polyisoprene, styrene isoprene rubber, styrene butadiene rubber, styrene isoprene butadiene rubber, polybutadiene rubber, nitrile rubber, partially hydrogenated nitrile rubber, polychloroprene and mixtures thereof.

* * * * *